(12) United States Patent (10) Patent No.: US 10,042,583 B2
Qiu et al. (45) Date of Patent: Aug. 7, 2018

(54) DEVICE MANAGEMENT METHOD, DEVICE, AND DEVICE MANAGEMENT CONTROLLER

(71) Applicant: Huawei Technologies Co., Ltd., Shenzhen (CN)

(72) Inventors: Xin Qiu, Shenzhen (CN); Jia Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/587,006

(22) Filed: May 4, 2017

(65) Prior Publication Data

US 2017/0235519 A1 Aug. 17, 2017

Related U.S. Application Data

(63) Continuation of application No. PCT/CN2015/093584, filed on Nov. 2, 2015.

(30) Foreign Application Priority Data

Dec. 31, 2014 (CN) .......................... 2014 1 0854780

(51) Int. Cl.
*G06F 3/06* (2006.01)
*G06F 13/42* (2006.01)
*G06F 13/16* (2006.01)

(52) U.S. Cl.
CPC .......... *G06F 3/0653* (2013.01); *G06F 3/0613* (2013.01); *G06F 3/0635* (2013.01);
(Continued)

(58) Field of Classification Search
CPC ......... G06F 11/3055; G06F 2212/7211; G06F 13/385; G06F 13/387
(Continued)

(56) References Cited

U.S. PATENT DOCUMENTS 6,594,786 B1  7/2003  Connelly et al.
8,127,128 B2 * 2/2012  Bristow .............. G06F 11/1425
                                                              713/1
(Continued)

FOREIGN PATENT DOCUMENTS

CN        1917450 A      2/2007
CN      101677276 A      3/2010
(Continued)

OTHER PUBLICATIONS

NVM Express Revision 1.1b—Jul. 2, 2014; 172 pages. (Year: 2014).*

(Continued)

*Primary Examiner* — Brian T Misiura
(74) *Attorney, Agent, or Firm* — Conley Rose, P.C.

(57) ABSTRACT

A device management method, a device, and a device management controller are provided. The method includes receiving, by a device, a first instruction message sent by a device management controller, determining, by the device according to the first instruction message, a status of current device management information compared with device management information in a previous query period, generating a first feedback message, where the first feedback message indicates the status of the device management information, and sending, by the device, the first feedback message to the device management controller such that the device management controller manages the device according to the first feedback message. The device feeds back to the device management controller only the status of the current device management information compared with the device management information in the previous query period, effectively reducing a transmission amount of device management information.

6 Claims, 6 Drawing Sheets

(52) U.S. Cl.
CPC .......... *G06F 3/0655* (2013.01); *G06F 3/0688* (2013.01); *G06F 13/1668* (2013.01); *G06F 13/4282* (2013.01); *G06F 2213/0026* (2013.01)

(58) Field of Classification Search
USPC ..................................................... 702/57–60
See application file for complete search history.

(56) References Cited

U.S. PATENT DOCUMENTS

| | | | | |
|---|---|---|---|---|
| 8,990,632 | B2* | 3/2015 | Baba | G06F 11/3006 714/44 |
| 9,195,588 | B2* | 11/2015 | Cepulis | G06F 3/0616 |
| 9,208,017 | B2* | 12/2015 | Wang | G06F 11/0793 |
| 9,384,367 | B2* | 7/2016 | Swanson | G06F 21/57 |
| 9,477,295 | B2* | 10/2016 | Jreji | G06F 1/3206 |
| 9,578,787 | B2* | 2/2017 | DeSouza | H05K 7/20836 |
| 9,652,376 | B2* | 5/2017 | Kuzmin | G06F 12/0246 |
| 2007/0088816 | A1* | 4/2007 | Hrustemovic | G06F 11/3027 709/224 |
| 2012/0246376 | A1* | 9/2012 | Kolblin | G05B 19/4185 710/305 |
| 2015/0120874 | A1* | 4/2015 | Kim | H04L 67/1097 709/218 |
| 2015/0309095 | A1* | 10/2015 | Monnerie | G01R 21/133 702/60 |
| 2017/0031857 | A1* | 2/2017 | Qiu | G06F 3/061 |
| 2018/0004434 | A1* | 1/2018 | Khan | G06F 3/0613 |

FOREIGN PATENT DOCUMENTS

| | | |
|---|---|---|
| CN | 102255657 A | 11/2011 |
| CN | 103188250 A | 7/2013 |

OTHER PUBLICATIONS

Machine Translation and Abstract of Chinese Publication No. CN1917450, dated Feb. 21, 2007, 14 pages.
Machine Translation and Abstract of Chinese Publication No. CN101677276, dated Mar. 24, 2010, 42 pages.
Machine Translation and Abstract of Chinese Publication No. CN102255657, dated Nov. 23, 2011, 10 pages.
Machine Translation and Abstract of Chinese Publication No. CN103188250, dated Jul. 3, 2013, 9 pages.
"NVM Express," Revision 1.2, Nov. 3, 2014, 205 pages.
Foreign Communication From a Counterpart Application, PCT Application No. PCT/CN2015/093584, English Translation of International Search Report dated Jan. 20, 2016, 2 pages.
Foreign Communication From a Counterpart Application, PCT Application No. PCT/CN2015/093584, English Translation of Written Opinion dated Jan. 20, 2016, 5 pages.
Foreign Communication From a Counterpart Application, European Application No. 15874955.6, Extended European Search Report dated Aug. 17, 2017, 9 pages.

\* cited by examiner

DEVICE MANAGEMENT METHOD, DEVICE, AND DEVICE MANAGEMENT CONTROLLER

CROSS-REFERENCE TO RELATED APPLICATIONS

This application is a continuation of International Patent Application No. PCT/CN2015/093584 filed on Nov. 2, 2015, which claims priority to Chinese Patent Application No. 201410854780.6 filed on Dec. 31, 2014. The disclosures of the aforementioned applications are hereby incorporated by reference in their entireties.

TECHNICAL FIELD

The present disclosure relates to the communications field, and in particular, to a device management method, a device, and a device management controller.

BACKGROUND

Figure 1A:
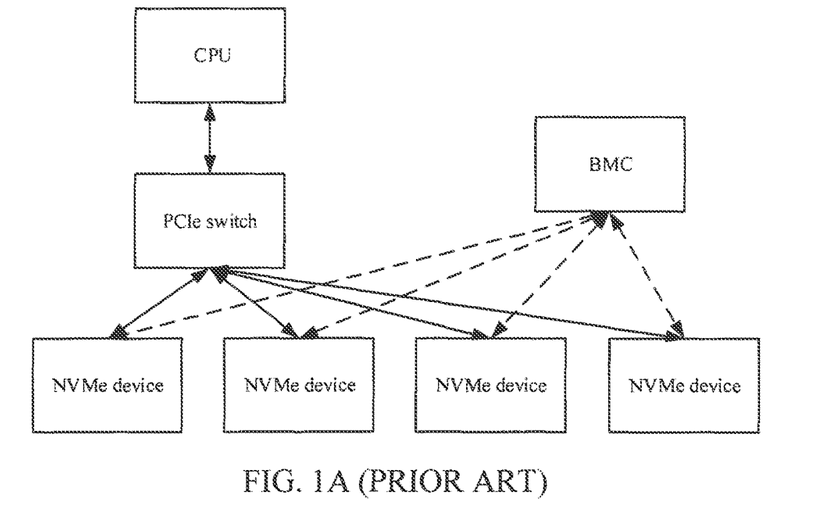
FIG. 1A is a schematic diagram of a plane architecture in an NVMe technology.

A baseboard management controller (BMC) chip is used for device management on a non-volatile memory express (NVMe) device. A status request instruction is sent to each NVMe device using the BMC chip in order to obtain device management information of each NVMe device. An NVMe technology includes a data plane and a device management plane. As shown in FIG. 1A, a solid line indicates the data plane in which a connection is implemented between central processing unit (CPU) and NVMe devices using a high-speed Peripheral Component Interconnect Express (PCIe) bus, and a dashed line indicates the device management plane in which a connection is implemented using an Inter Integrated Circuit (I2C) bus or a System Management Bus (SMBus). The device management plane focuses on how a device management chip controls, maintains, and monitors an NVMe device card in a system, including but not limited to, in-position detection of the NVMe device, dimension monitoring, hard disk storage space usage, and an error alarm.

The BMC chip regularly sends a command to the NVMe device (for example, sending once every 5 seconds (s)), to query related device management information. After receiving the related command, the managed NVMe device reads all information requested by the query command and returns all the information to a BMC for processing. In most cases, the information returned by the NVMe device to the BMC is unchanged, or is within a normal range. For example, in most cases, temperature information reported by the NVMe device is within a proper range, or is even unchanged, and the BMC does not need to generate an alarm. After receiving same temperature information, the BMC discards the information after performing some determining.

Figure 1B:
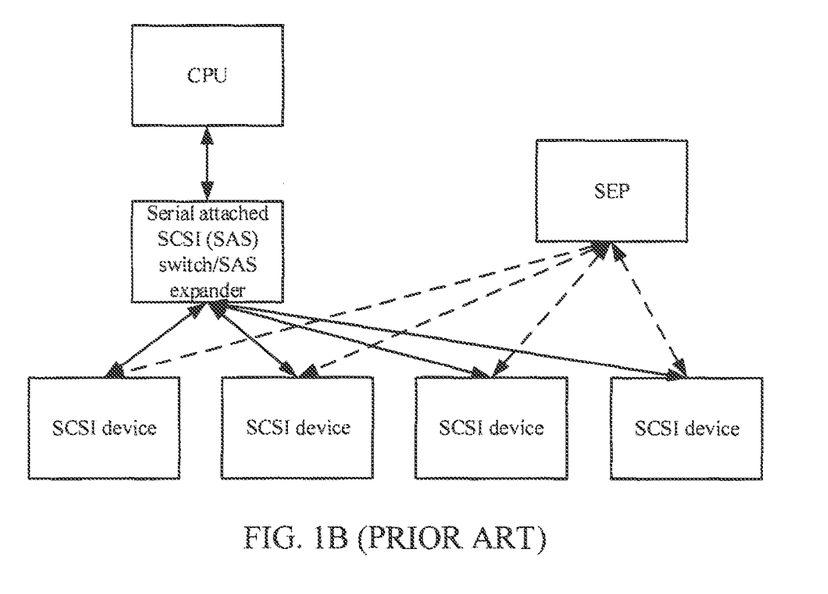
FIG. 1B is a schematic diagram of a plane architecture in an SCSI technology.

In a small computer system interface (SCSI) architecture, as shown in FIG. 1B, a storage enclosure processor (SEP) chip manages an SCSI device. The SEP chip, such as an MG9071 or MG9072 chip of the American Megatrends, Incorporated (AMI) Company, manages the SCSI device according to device management information fed back by the SCSI device, such as a voltage, a temperature, or a fan. Similarly, in most cases, information returned by the SCSI device to a SEP is unchanged.

Much management bus bandwidth between a BMC and an NVMe device or between a SEP and an SCSI device is occupied because much repeated information is reported during each transmission. Particularly when there are many NVMe devices managed by the BMC or many SCSI devices managed by the SEP, the problem is more serious. Consequently, a quantity of NVMe devices that can be managed by the BMC or a quantity of SCSI devices that can be managed by the SEP are greatly limited.

SUMMARY

The present disclosure provides a device management method, a device, and a device management controller. This effectively reduces a transmission amount of device management information, and can reduce occupied management bus bandwidth between the device management controller and the device such that the device management controller can manage more devices.

According to a first aspect, an NVMe device management method is provided, including receiving, by a device, a first instruction message sent by a device management controller, determining, by the device according to the first instruction message, a status of current device management information compared with device management information in a previous query period, and generating a first feedback message, where the first feedback message indicates the status of the current device management information compared with the device management information in the previous query period, and sending, by the device, the first feedback message to the device management controller such that the device management controller manages the device according to the first feedback message.

With reference to the first aspect, in a first possible implementation manner, the first feedback message indicates that the device management information is changed and/or abnormal, and the method further includes receiving, by the device, a second instruction message sent by the device management controller according to the first feedback message, where the second instruction message instructs the device to send changed and/or abnormal information in the device management information to the device management controller, and sending a second feedback message to the device management controller according to the second instruction message, where the second feedback message includes the changed and/or abnormal information in the device management information.

With reference to the first aspect, in a second possible implementation manner, the first feedback message indicates that the device management information is unchanged or normal.

With reference to the first aspect, in a third possible implementation manner, the first feedback message includes changed and/or abnormal information in the device management information.

With reference to any one of the first aspect, or the first to the third possible implementation manners, in a fourth possible implementation manner, the device management information includes at least one piece of the following information: an in-position status, a temperature, a power status, a working status, storage space, or software configuration information of the device.

With reference to any one of the first aspect, or the first to the fourth possible implementation manners, in a fifth possible implementation manner, the device is an NVMe device, and the device management controller is a BMC.

With reference to any one of the first aspect, or the first to the fourth possible implementation manners, in a sixth possible implementation manner, the device is an SCSI device, and the device management controller is a SEP.

According to a second aspect, an NVMe device management method is provided, including sending, by a device management controller, a first instruction message to a device, receiving, by the device management controller, a first feedback message sent by the device according to the first instruction message, where the first feedback message indicates a status of current device management information of the device compared with device management information in a previous query period, and managing, by the device management controller, the device according to the first feedback message.

With reference to the second aspect, in a first possible implementation manner of the second aspect, the first feedback message indicates that the device management information is changed and/or abnormal, and managing, by the device management controller, the device according to the first feedback message includes sending, by the device management controller, a second instruction message to the device according to the first feedback message, where the second instruction message instructs the device to send changed and/or abnormal information in the device management information to the device management controller, receiving, by the device management controller, a second feedback message sent by the device, where the second feedback message includes the changed and/or abnormal information in the device management information, and managing, by the device management controller, the device according to the second feedback message.

With reference to the second aspect, in a second possible implementation manner of the second aspect, the first feedback message indicates that the device management information is unchanged or normal.

With reference to the second aspect, in a third possible implementation manner of the second aspect, the first feedback message includes changed and/or abnormal information in the device management information.

With reference to any one of the second aspect, or the first to the third possible implementation manners of the second aspect, in a fourth possible implementation manner of the second aspect, the device management information includes at least one piece of the following information: an in-position status, a temperature, a power status, a working status, storage space, or software configuration information of the device.

With reference to any one of the second aspect, or the first to the fourth possible implementation manners of the second aspect, in a fifth possible implementation manner of the second aspect, the device management controller is a BMC, and the device is an NVMe device.

With reference to any one of the second aspect, or the first to the fourth possible implementation manners of the second aspect, in a sixth possible implementation manner of the second aspect, the device management controller is a SEP, and the device is an SCSI device.

According to a third aspect, an NVMe device is provided, including a receiving unit configured to receive a first instruction message sent by a device management controller, a processing unit configured to determine, according to the first instruction message, a status of current device management information compared with device management information in a previous query period, and generate a first feedback message, where the first feedback message indicates the status of the current device management information compared with the device management information in the previous query period, and a sending unit configured to send the first feedback message to the device management controller such that the device management controller manages the device according to the first feedback message.

With reference to the third aspect, in a first possible implementation manner of the third aspect, the first feedback message indicates that the device management information is changed and/or abnormal. The receiving unit is further configured to receive a second instruction message sent by the device management controller according to the first feedback message, where the second instruction message instructs the device to send changed and/or abnormal information in the device management information to the device management controller, and the sending unit is further configured to send a second feedback message to the device management controller according to the second instruction message, where the second feedback message includes the changed and/or abnormal information in the device management information.

With reference to the third aspect, in a second possible implementation manner of the third aspect, the first feedback message indicates that the device management information is unchanged or normal.

With reference to the third aspect, in a third possible implementation manner of the third aspect, the first feedback message includes changed and/or abnormal information in the device management information.

With reference to any one of the third aspect, or the first to the third possible implementation manners of the third aspect, in a fourth possible implementation manner of the third aspect, the device management information includes at least one piece of the following information: an in-position status, a temperature, a power status, a working status, storage space, or software configuration information of the device.

With reference to any one of the third aspect, or the first to the fourth possible implementation manners of the third aspect, in a fifth possible implementation manner of the third aspect, the device is an NVMe device, and the device management controller is a BMC.

With reference to any one of the third aspect, or the first to the fourth possible implementation manners of the third aspect, in a sixth possible implementation manner of the third aspect, the device is an SCSI device, and the device management controller is a SEP.

According to a fourth aspect, a device management controller is provided, including a sending unit configured to send a first instruction message to a device, a receiving unit configured to receive a first feedback message sent by the device according to the first instruction message, where the first feedback message indicates a status of current device management information of the device compared with device management information in a previous query period, and a processing unit configured to manage the device according to the first feedback message.

With reference to the fourth aspect, in a first possible implementation manner of the fourth aspect, the first feedback message indicates that the device management information is changed and/or abnormal. The sending unit is further configured to send a second instruction message to the device according to the first feedback message, where the second instruction message instructs the device to send changed and/or abnormal information in the device management information to the device management controller. The receiving unit is further configured to receive a second feedback message sent by the device, where the second feedback message includes the changed and/or abnormal information in the device management information, and the processing unit is configured to manage the device according to the second feedback message.

With reference to the fourth aspect, in a second possible implementation manner of the fourth aspect, the first feedback message indicates that the device management information is unchanged or normal.

With reference to the fourth aspect, in a third possible implementation manner of the fourth aspect, the first feedback message includes changed and/or abnormal information in the device management information.

With reference to any one of the fourth aspect, or the first to the third possible implementation manners of the fourth aspect, in a fourth possible implementation manner of the fourth aspect, the device management information includes at least one piece of the following information: an in-position status, a temperature, a power status, a working status, storage space, or software configuration information of the device.

With reference to any one of the fourth aspect, or the first to the fourth possible implementation manners of the fourth aspect, in a fifth possible implementation manner of the fourth aspect, the device management controller is a BMC, and the device is an NVMe device.

With reference to any one of the fourth aspect, or the first to the fourth possible implementation manners of the fourth aspect, in a sixth possible implementation manner of the fourth aspect, the device management controller is a SEP, and the device is an SCSI device.

According to the foregoing technical solutions of the present disclosure, a device feeds back to a device management controller only a status of current device management information compared with device management information in a previous query period. This effectively reduces a transmission amount of device management information, and can reduce occupied management bus bandwidth between the device management controller and the device such that the device management controller can manage more devices.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the term "and/or" in this embodiment of the present disclosure describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

Figure 2:
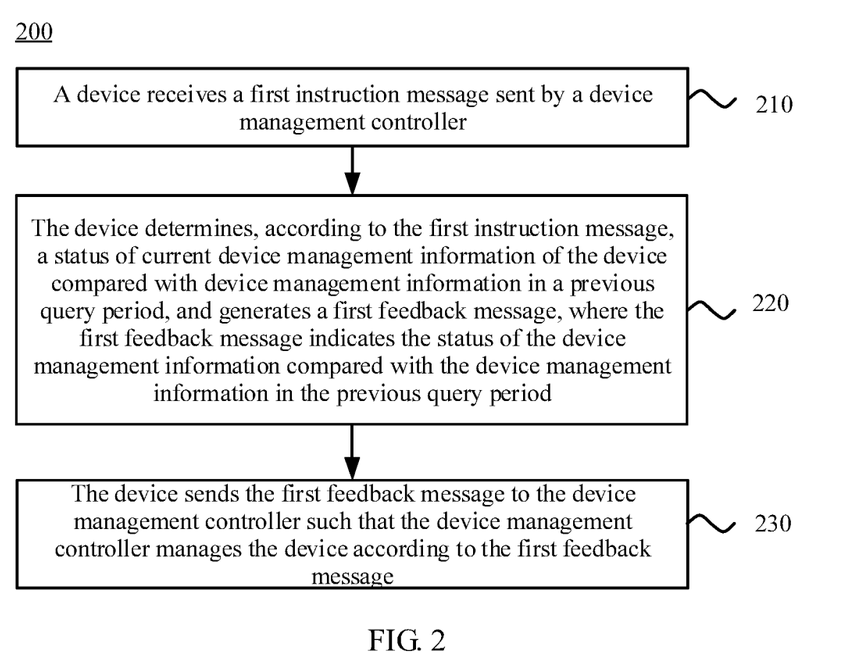
FIG. 2 is a schematic flowchart of a device management method according to an embodiment of the present disclosure.

FIG. 2 is a schematic flowchart of a device management method 200 according to an embodiment of the present disclosure. As shown in FIG. 2, the method 200 may include the following steps.

Step 210: A device receives a first instruction message sent by a device management controller.

For example, the device may receive the first instruction message regularly or periodically sent by the device management controller.

Device management information may include at least one piece of the following information: an in-position status, a temperature, a power status, a working status, storage space, or software configuration information of the device.

The device management controller may be a chip, or may be a module integrated into a chip. This is not limited in this embodiment of the present disclosure.

Step 220: The device determines, according to the first instruction message, a status of current device management information of the device compared with device management information in a previous query period, and generates a first feedback message, where the first feedback message indicates the status of the device management information compared with the device management information in the previous query period.

It should be understood that before 220, the method 200 may further include obtaining, by the device, the current device management information according to the first instruction message. The device may enable detection to obtain the device management information. For example, the device may detect a current temperature. Alternatively, the device may directly obtain the device management information. For example, the device may directly read current software configuration information from a register. This is not limited in this embodiment of the present disclosure.

The first feedback message may be used to indicate whether the current device management information of the device is changed and/or abnormal, compared with the device management information in the previous query period.

It should be understood that the device management information in the previous query period may be stored in the device.

Step 230: The device sends the first feedback message to the device management controller such that the device management controller manages the device according to the first feedback message.

In this embodiment of the present disclosure, a device feeds back to a device management controller only a status of current device management information compared with device management information in a previous query period. This effectively reduces a transmission amount of device management information, and can reduce occupied management bus bandwidth between the device management controller and the device such that the device management controller can manage more devices.

It should be understood that in this embodiment of the present disclosure, the device may be an NVMe device or an SCSI device. Correspondingly, the device management controller is a BMC when the device is an NVMe device, and the device management controller is a SEP when the device is an SCSI device.

Optionally, in another embodiment, the first feedback message includes changed and/or abnormal information in the device management information.

That is, after the device receives the sent first instruction message, the device obtains the current device management information according to the first instruction message, and compares the current device management information with the device management information obtained in the previous query period. If the device management information is changed and/or abnormal, the device may directly send the changed and/or abnormal information in the device management information to the device management controller.

The device may feed back to the device management controller only the changed information in the device management information, where the changed information may be within a normal value range or may beyond a normal value range (namely, abnormal information), and in this case, the device management controller considers by default that the information not fed back is unchanged. Alternatively, the device may feed back to the device management controller only the abnormal information in the device management information, where the abnormal information may be changed or may be unchanged compared with the device management information in the previous query period, and in this case, the device management controller considers by default that the information not fed back is unchanged or is changed only within a normal value range. Alternatively, the device may feed back to the device management controller the changed information and the abnormal information in the device management information, where the abnormal information may be unchanged compared with the device management information in previous device detection.

A number may be set for each type of information when the device sends the first feedback message to the device management controller. For example, a temperature number is 1, and an in-position status number is 2. In the first feedback message returned by the device to the device management controller, a corresponding number may be added before a value of each type of information such that the device management controller recognizes a status type of changed information. In the first feedback message returned to the device management controller, only a number and corresponding content of changed information may be added.

It should be noted that in this embodiment of the present disclosure, the device directly sends the changed and/or abnormal information in the device management information to the device management controller after determining that the device management information is changed or abnormal, and the device management controller cannot learn in advance a device whose device management information is changed and/or abnormal. Therefore, when the device management controller manages many devices, a proper buffer resource may not be reserved in advance. Therefore, the device management method in this embodiment of the present disclosure is more applicable to an application scenario in which the device management controller manages a small number of devices.

In addition, when the first feedback message indicates that the device management information is abnormal, the device management controller may directly manage the device, and content of the abnormal information does not need to be fed back to the device management controller. For example, when the temperature of the device is abnormal, a feedback message may be sent to the device management controller to notify the device management controller that the temperature is abnormal. In this case, the device may not feedback a temperature value to the device management controller. The device management controller may directly perform alarm processing in order to notify an administrator that the temperature is abnormal.

Optionally, in another embodiment, the first feedback message may indicate that the device management information is unchanged or normal. The device management controller may perform processing the same as that in a previous query when the first feedback message indicates that the device management information is unchanged, and the device management controller may not perform processing when the first feedback message indicates that the device management information is normal.

It should be understood that when the device management information is unchanged or normal, the device may not feed back any message to the device management controller, and when the device management controller does not receive a feedback message from the device in a preset time segment, it may be considered by default that the device management information of the device is unchanged or normal.

Optionally, in another embodiment, when the first feedback message indicates that the device management information is changed and/or abnormal, after step 230, the method 200 may further include receiving, by the device, a second instruction message sent by the device management controller according to the first feedback message, where the second instruction message instructs the device to send changed and/or abnormal information in the device management information to the device management controller, and sending a second feedback message to the device management controller according to the second instruction message, where the second feedback message includes the changed and/or abnormal information in the device management information.

In this embodiment of the present disclosure, after determining that device management information is changed and/or abnormal, a device first notifies a device management controller, and then sends changed and/or abnormal information in the device management information to the device management controller after receiving a second instruction message sent by the device management controller such that the device management controller can learn in advance a device whose device management information is changed, and a proper buffer resource can be reserved in advance. Therefore, the device management method in this embodiment of the present disclosure is more applicable to an application scenario in which the device management controller manages many devices.

Figure 3:
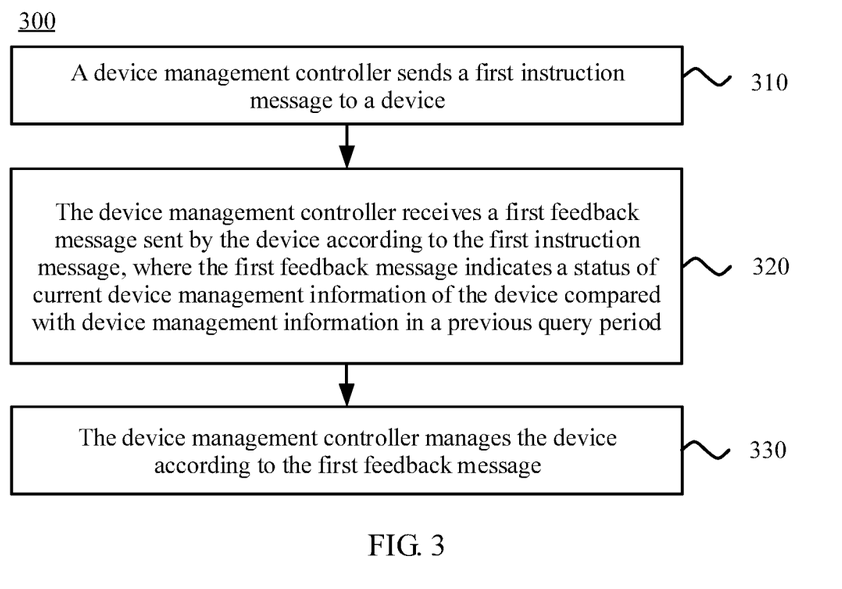
FIG. 3 is a schematic flowchart of a device management method according to another embodiment of the present disclosure.

FIG. 3 is a schematic flowchart of an NVMe device management method 300 according to another embodiment of the present disclosure. The method in FIG. 3 corresponds to the method in FIG. 2, and repeated description is appropriately omitted to avoid repetition. As shown in FIG. 3, the method 300 may include the following steps.

Step 310: A device management controller sends a first instruction message to a device.

For example, the device management controller may regularly or periodically send the first instruction message to the device. The first instruction message may be used to instruct the device to feedback to the device management controller a status of current device management information compared with device management information in a previous query period.

The device management information may include at least one piece of the following information: an in-position status, a temperature, a power status, a working status, storage space, or software configuration information of the device.

The device management controller may be a BMC or a SEP. The device is an NVMe device when the device management controller is a BMC. The device is an SCSI device when the device management controller is a SEP.

Step 320: The device management controller receives a first feedback message sent by the device according to the first instruction message, where the first feedback message indicates a status of current device management information of the device compared with device management information in a previous query period.

Step 330: The device management controller manages the device according to the first feedback message.

For example, when the device finds that compared with that in the previous query period, the temperature of the device increases and is beyond a normal range, the device management controller sends an alarm notification to a network administrator.

In this embodiment of the present disclosure, a device management controller receives from a device a status of current device management information compared with device management information in a previous query period. This effectively reduces a transmission amount of device management information, and can reduce occupied management bus bandwidth between the device management controller and the device such that the device management controller can manage more devices.

Optionally, in another embodiment, the first feedback message includes changed and/or abnormal information in the device management information.

In this embodiment of the present disclosure, the device directly sends the changed and/or abnormal information in the device management information to the device management controller after detecting and determining that the device management information is changed and/or abnormal. Therefore, the device management controller cannot learn in advance a device whose device management information is changed and/or abnormal, and a proper buffer resource cannot be reserved in advance. Therefore, the device management method in this embodiment of the present disclosure is more applicable to an application scenario in which the device management controller manages a small number of devices.

In addition, when the first feedback message indicates that the device management information is abnormal, the device management controller may directly manage the device, and content of the abnormal information is not required to be further fed back. For example, when learning, after receiving the first feedback message from the device, that the temperature is abnormal, the device management controller may not require the device to feed back a temperature value, and may directly perform alarm processing in order to notify an administrator that the temperature is abnormal.

Optionally, in another embodiment, the first feedback message indicates that the device management information is unchanged or normal. The device management controller may perform processing the same as that in a previous query when the first feedback message indicates that the device management information is unchanged, and the device management controller may not perform processing when the first feedback message indicates that the device management information is normal.

It should be understood that when the device management controller does not receive a feedback message from the device in a preset time period, it may be considered by default that the device management information of the device is unchanged or normal.

Optionally, in another embodiment, when the first feedback message indicates that the device management information is changed and/or abnormal, step 330 may include sending, by the device management controller, a second instruction message to the device according to the first feedback message, where the second instruction message instructs the device to send changed and/or abnormal information in the device management information to the device management controller, receiving, by the device management controller, a sent second feedback message, where the second feedback message includes the changed and/or abnormal information in the device management information, and managing, by the device management controller, the device according to the second feedback message.

In this embodiment of the present disclosure, after determining that device management information is changed and/or abnormal, a device first notifies a device management controller, and then sends changed and/or abnormal information in the device management information to the device management controller after receiving a second instruction message sent by the device management controller such that the device management controller can learn in advance a device whose device management information is changed, and a proper buffer resource can be reserved in advance. Therefore, the device management method in this embodiment of the present disclosure is more applicable to an application scenario in which the device management controller manages many devices.

In addition, in this embodiment of the present disclosure, the device management controller only needs to process the changed and/or abnormal information, and does not need to repeatedly process same device management information, thereby saving CPU resources of the device management controller.

Figure 4:
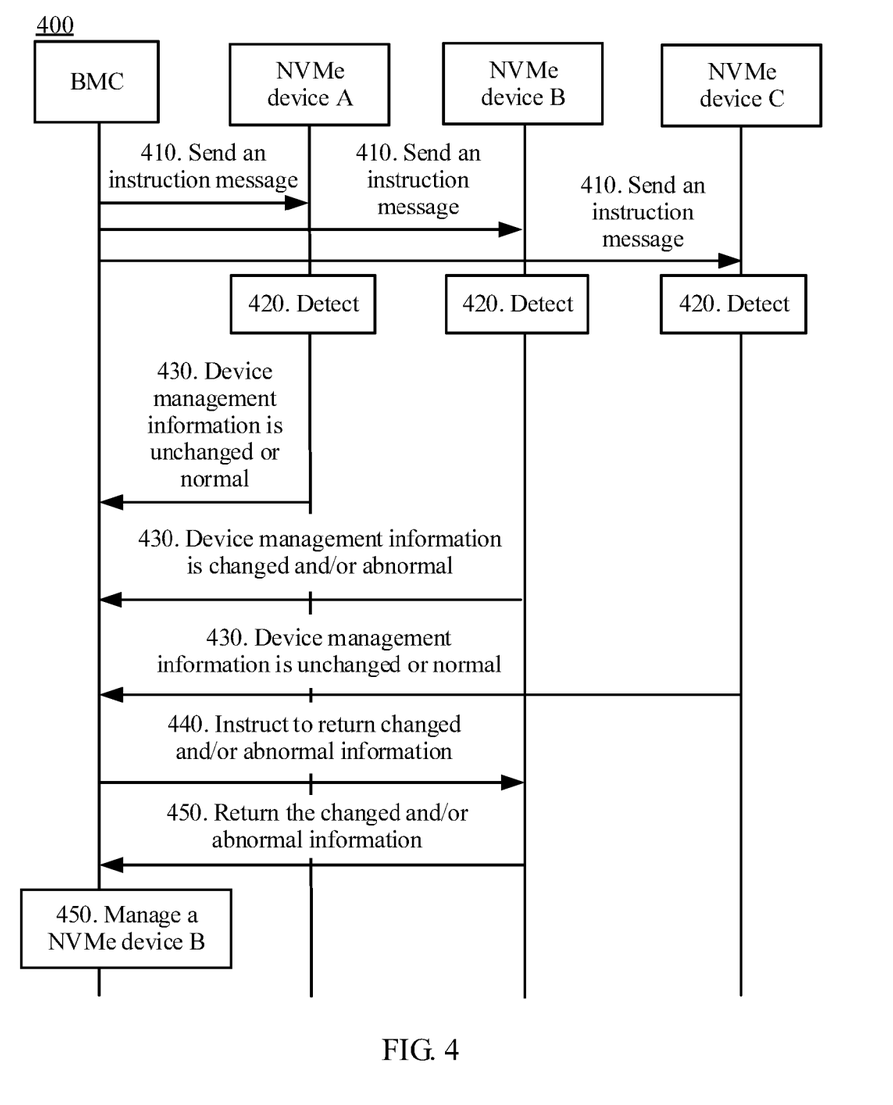
FIG. 4 is a schematic flowchart of a device management method according to another embodiment of the present disclosure.
Figure 5:
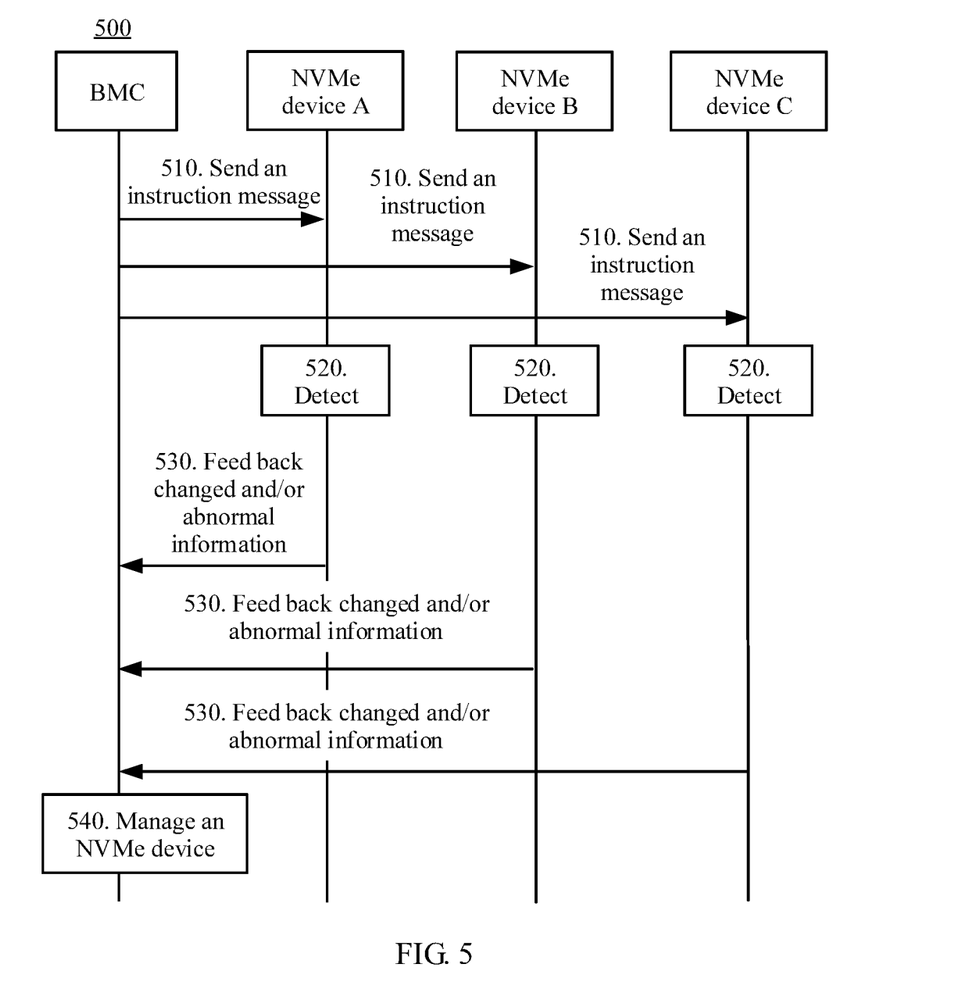
FIG. 5 is a schematic flowchart of a device management method according to another embodiment of the present disclosure.

With reference to FIG. 4 and FIG. 5, the following describes in detail a device management method according to an embodiment of the present disclosure.

FIG. 4 shows a schematic flowchart of an NVMe device management method 400 according to an embodiment of the present disclosure. As shown in FIG. 4, the method 400 includes the following steps.

Step 410: A BMC separately sends an instruction message to an NVMe device A, an NVMe device B, and an NVMe device C that are managed by the BMC, to instruct each NVMe device to detect its device management information.

Step 420: Each NVMe device detects current device management information after receiving the instruction message. Each NVMe device may compare the current device management information with device management information in a previous query period in order to determine whether the current device management information is changed and/or abnormal.

Step 430: Return a detection result to the BMC. For example the detection result of the NVMe device A includes that the device management information is unchanged or normal, the detection result of the NVMe device B includes that the device management information is changed and/or abnormal, and the detection result of the NVMe device C includes that the device management information is unchanged or normal.

Step 440: The BMC collects the detection result of each NVMe device. The BMC further sends a request message to the NVMe device B, whose device management information is changed and/or abnormal in order to request the NVMe device B to return changed and/or abnormal information in the device management information to the BMC.

Step 450: The NVMe device B returns the changed and/or abnormal information to the BMC, and BMC manages the NVMe device B according to the information fed back by the NVMe device B.

For an NVMe device feeding back a detection result that device management information of the NVMe device is unchanged or normal, the BMC does not need to perform further processing, and directly starts a next query after a query period ends.

In this embodiment of the present disclosure, an NVMe device feeds back to a BMC only a status of current device management information compared with device management information in a previous query period. This effectively reduces a transmission amount of device management information, and can reduce occupied management bus bandwidth between the BMC and the NVMe device such that the BMC can manage more NVMe devices.

In addition, the BMC can learn in advance an NVMe device whose device management information is changed and/or abnormal, and a proper buffer resource can be reserved in advance. Therefore, the method is more applicable to an application scenario in which the BMC manages many NVMe devices.

FIG. 5 shows a schematic flowchart of a device management method 500 according to another embodiment of the present disclosure. As shown in FIG. 5, the method 500 includes the following steps.

Step 510: A BMC sends an instruction message to an NVMe device A, an NVMe device B, and an NVMe device C in order to instruct the NVMe devices request to detect and feedback device management information.

The BMC may regularly send the instruction message to the NVMe device.

Step 520: After receiving the instruction message, the NVMe device detects whether current device management information is changed and/or abnormal, compared with device management information in a previous query period.

Step 530: The NVMe device sends a feedback message to the BMC, where the feedback message includes changed and/or abnormal information in the device management information.

The NVMe device may further set a corresponding number for each type of information in the device management information, and add a number before a value of each type of information such that the BMC recognizes a status type of each piece of information.

It should be understood that a feedback message may not be sent to the BMC when the device management information of the NVMe device is unchanged or normal, and it may be considered by default that the device management information of the NVMe device is unchanged or normal when the BMC does not receive a feedback message sent by the NVMe device in a preset time period.

Step 540: The BMC manages the NVMe device according to information in the feedback message after receiving the feedback message sent by the NVMe device.

After receiving a response packet returned by the NVMe device, the BMC parses each piece of information one by one according to an information number in the response packet, and performs corresponding processing.

In this embodiment of the present disclosure, a BMC receives only changed and/or abnormal information in device management information of an NVMe device. This effectively reduces a transmission amount of device management information, and can reduce occupied management bus bandwidth between the BMC and the NVMe device such that the BMC can manage more NVMe devices. In addition, the BMC only needs to process the changed and/or abnormal information, and does not need to repeatedly process same device management information, thereby saving CPU resources of the BMC.

In addition, the BMC cannot learn in advance an NVMe device whose device management information is changed and/or abnormal, and a proper buffer resource cannot be reserved in advance. Therefore, the NVMe device management method in this embodiment of the present disclosure is more applicable to an application scenario in which the BMC manages a small number of NVMe devices.

It should be understood that the examples in FIG. 4 and FIG. 5 are merely intended to help a person skilled in the art better understand the embodiments of the present disclosure, but are not intended to limit the scope of the embodiments of the present disclosure. A person skilled in the art certainly can make various equivalent modifications or changes according to the examples provided in FIG. 4 and FIG. 5, and such modifications or changes also fall within the protection scope of the present disclosure.

It should be further understood that the embodiments in FIG. 4 and FIG. 5 are described only using an NVMe device and a BMC as an example, and for a corresponding procedure of interaction between an SCSI device and a SEP, reference may be made to the corresponding procedures in FIG. 4 and FIG. 5. For brevity, details are not described herein.

With reference to FIG. 2 to FIG. 5, the device management methods according to the embodiments of the present disclosure are described above in detail. With reference to FIG. 6 to FIG. 9, a device and a device management controller according to embodiments of the present disclosure are described below in detail.

Figure 6:
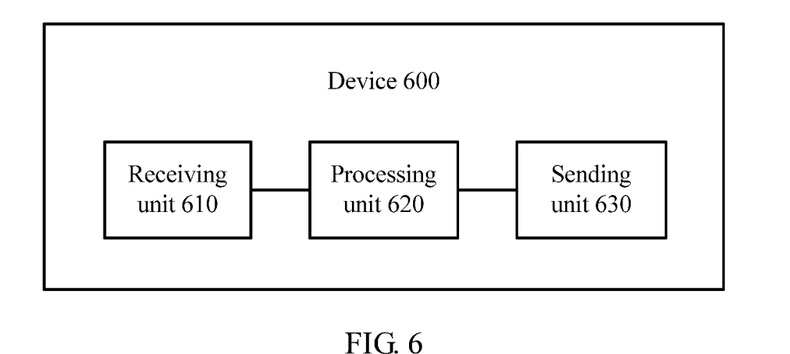
FIG. 6 is a schematic block diagram of a device according to an embodiment of the present disclosure.

FIG. 6 is a schematic block diagram of a device 600 according to an embodiment of the present disclosure. The device 600 may be an NVMe device, or may be an SCSI device. As shown in FIG. 6, the device 600 includes a receiving unit 610, a processing unit 620, and a sending unit 630.

The receiving unit 610 is configured to receive a first instruction message sent by a device management controller.

The processing unit 620 is configured to determine, according to the first instruction message, a status of current device management information compared with device management information in a previous query period, and generate a first feedback message, where the first feedback message indicates the status of the device management information compared with the device management information in the previous query period.

The sending unit 630 is configured to send the first feedback message to the device management controller such that the device management controller manages the device according to the first feedback message.

In this embodiment of the present disclosure, only a status of current device management information compared with device management information in a previous query period is fed back to a device management controller. This effectively reduces a transmission amount of device management information, and can reduce occupied management bus bandwidth between the device management controller and the device such that the device management controller can manage more devices.

It should be understood that when the device 600 is a NVMe device, the device management controller is a BMC, when the device 600 is an SCSI device, the device management controller is a SEP.

Optionally, in another embodiment, the first feedback message may include changed and/or abnormal information in the device management information.

It should be noted that in this embodiment of the present disclosure, the device 600 directly sends the changed and/or abnormal information in the device management information to the device management controller after detecting and determining that the device management information is changed and/or abnormal, and the device management controller cannot learn in advance a device 600 whose device management information is changed and/or abnormal. Therefore, when the device management controller manages many devices 600, a proper buffer resource may not be reserved in advance. Therefore, the NVMe device management method in this embodiment of the present disclosure is more applicable to an application scenario in which the device management controller manages a small number of devices 600.

Optionally, in another embodiment, the first feedback message indicates that the device management information is unchanged or normal. The device management controller may perform processing the same as that in a previous query when the first feedback message indicates that the device management information is unchanged, and when the first feedback message indicates that the device management information is normal, the device management controller may not perform processing.

Optionally, in another embodiment, the first feedback message indicates that the device management information is changed and/or abnormal. The receiving unit 610 may be further configured to receive a second instruction message sent by the device management controller according to the first feedback message, where the second instruction message instructs the device 600 to send changed and/or abnormal information in the device management information to the device management controller. The sending unit 630 may be further configured to send a second feedback message to the device management controller according to the second instruction message, where the second feedback message includes the changed and/or abnormal information in the device management information.

In this embodiment of the present disclosure, after determining that device management information is changed and/or abnormal, a device 600 first notifies a device management controller, and then sends changed and/or abnormal information in the device management information to the device management controller after receiving a second instruction message sent by the device management controller such that the device management controller can learn in advance a device 600 whose device management information is changed, and a proper buffer resource can be reserved in advance. Therefore, the device management method in this embodiment of the present disclosure is more applicable to an application scenario in which the device management controller manages many devices 600.

It should be understood that the device 600 in this embodiment of the present disclosure may be corresponding to a device in the device management method in the embodiment of the present disclosure, and the foregoing and other operations and/or functions of the modules in the device 600 are respectively used to implement the corresponding procedures of the methods 200 to 500 in FIG. 2 to FIG. 5. For brevity, details are not described herein.

Figure 7:
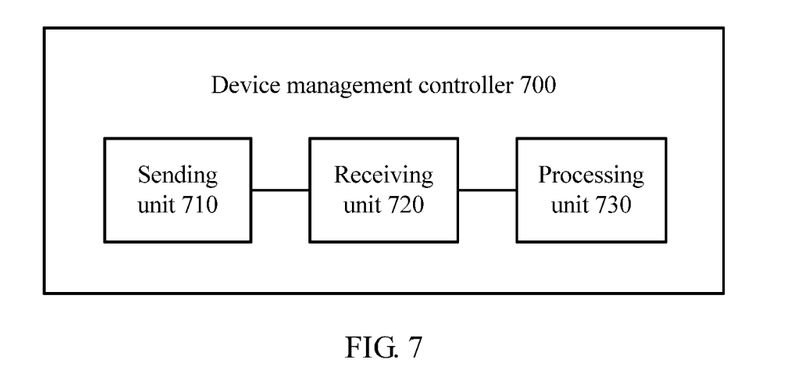
FIG. 7 is a schematic block diagram of a device management controller according to an embodiment of the present disclosure.

FIG. 7 is a schematic block diagram of a device management controller 700 according to an embodiment of the present disclosure. The device management controller 700 may be a BMC, or may be a SEP. As shown in FIG. 7, the device management controller 700 includes a sending unit 710, a receiving unit 720, and a processing unit 730.

The sending unit 710 is configured to send a first instruction message to a device.

Device management information may include at least one piece of the following information: an in-position status, a temperature, a power status, a working status, storage space, or software configuration information of an NVMe device.

The receiving unit 720 is configured to receive a first feedback message sent by the device, where the first feedback message indicate a status of current device management information of the device compared with device management information in a previous query period.

The processing unit 730 is configured to manage the device according to the first feedback message.

In this embodiment of the present disclosure, a device management controller 700 receives from a device a status of current device management information compared with device management information in a previous query period. This effectively reduces a transmission amount of device management information, and can reduce occupied management bus bandwidth between the device management controller 700 and the device such that the device management controller 700 can manage more devices. In addition, in this embodiment of the present disclosure, the device management controller 700 only needs to process changed and/or abnormal information, and does not need to repeatedly process same device management information, thereby saving CPU resources of the device management controller 700.

It should be understood that the device is an NVMe device when the device management controller 700 is a BMC, and the device is an SCSI device when the device management controller 700 is a SEP.

Optionally, in another embodiment, the first feedback message includes changed and/or abnormal information in the device management information.

In this embodiment of the present disclosure, the device directly sends the changed and/or abnormal information in the device management information to the device management controller 700 after detecting and determining that the device management information is changed and/or abnormal. Therefore, the device management controller 700 cannot learn in advance a device whose device management information is changed and/or abnormal, and a proper buffer resource cannot be reserved in advance. Therefore, the device management method in this embodiment of the present disclosure is more applicable to an application scenario in which the device management controller 700 manages a small number of devices.

Optionally, in another embodiment, the first feedback message indicates that the device management information is unchanged or normal. The device management controller may perform processing the same as that in a previous query when the first feedback message indicates that the device management information is unchanged, and the device management controller may not perform processing when the first feedback message indicates that the device management information is normal.

It should be understood that when the device management controller does not receive a feedback message from the device in a preset time period, it may be considered by default that the device management information of the device is unchanged or normal.

Optionally, in another embodiment, the first feedback message indicates that the device management information is changed and/or abnormal. The sending unit 710 is further configured to send a second instruction message to the device according to the first feedback message, where the second instruction message instructs the device to send changed and/or abnormal information in the device management information to the device management controller 700. The receiving unit 720 is further configured to receive a second feedback message sent by the device, where the second feedback message includes the changed and/or abnormal information in the device management information. The processing unit 730 is configured to manage the device according to the second feedback message.

In this embodiment of the present disclosure, after determining that device management information is changed and/or abnormal, a device first notifies a device management controller 700, and then sends changed and/or abnormal information in the device management information to the device management controller 700 after receiving a second instruction message sent by the device management controller 700 such that the device management controller 700 can learn in advance a device whose device management information is changed, and a proper buffer resource can be reserved in advance. Therefore, the device management method in this embodiment of the present disclosure is more applicable to an application scenario in which the device management controller 700 manages many devices.

It should be understood that the device management controller 700 in this embodiment of the present disclosure may be corresponding to a device management controller in the device management method in the embodiment of the present disclosure, and the foregoing and other operations and/or functions of the modules in the device management controller 700 are respectively used to implement the corresponding procedures of the methods 300 to 500 in FIG. 3 to FIG. 5. For brevity, details are not described herein.

Figure 8:
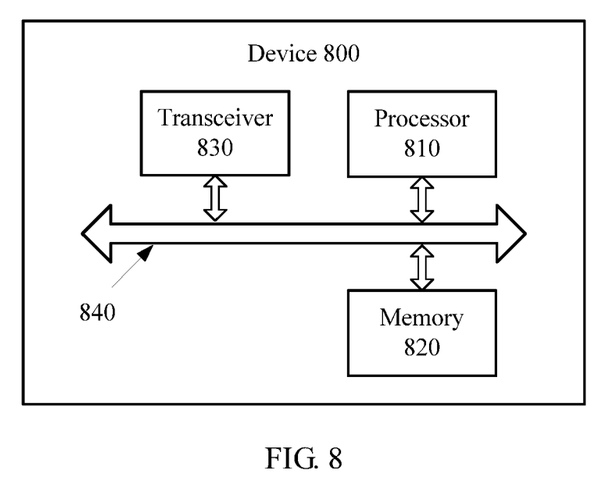
FIG. 8 is a schematic block diagram of a device according to another embodiment of the present disclosure.

FIG. 8 is a schematic block diagram of a device 800 according to another embodiment of the present disclosure. As shown in FIG. 8, the device 800 includes a processor 810, a memory 820, and a transceiver 830. The processor 810, the memory 820, and the transceiver 830 are connected using a bus 840. The bus 840 may include a data bus, and may further include a power bus, a control bus, a status signal bus, and the like. The memory 820 may include a read-only memory (ROM) and a random access memory (RAM), and may provide an instruction and data for the processor 810.

The transceiver 830 is configured to receive a first instruction message sent by a device management controller.

Device management information may include at least one piece of the following information: an in-position status, a temperature, a power status, a working status, storage space, or software configuration information of the device.

The processor 810 is configured to determine, according to the first instruction message, a status of current device management information compared with device management information in a previous query period, and generate a first feedback message, where the first feedback message indicates the status of the current device management information compared with the device management information in the previous query period.

The transceiver 830 is further configured to send the first feedback message to the device management controller such that the device management controller manages the device according to the first feedback message.

In this embodiment of the present disclosure, a device 800 feeds back to a device management controller only a status of current device management information compared with device management information in a previous query period. This effectively reduces a transmission amount of device management information, and can reduce occupied management bus bandwidth between the device management controller and the device 800 such that the device management controller can manage more devices 800.

Optionally, in another embodiment, the first feedback message may include changed and/or abnormal information in the device management information.

Optionally, in another embodiment, the first feedback message indicates that the device management information is unchanged or normal. The device management controller may perform processing the same as that in the previous query period when the first feedback message indicates that the device management information is unchanged, and the device management controller may not perform processing when the first feedback message indicates that the device management information is normal.

Optionally, in another embodiment, the first feedback message indicates that the device management information is changed and/or abnormal. The transceiver 830 may be further configured to receive a second instruction message sent by the device management controller according to the first feedback message, where the second instruction message instructs the device 800 to send changed and/or abnormal information in the device management information to the device management controller, and send a second feedback message to the device management controller according to the second instruction message, where the second feedback message includes the changed and/or abnormal information in the device management information.

It should be understood that the device 800 in this embodiment of the present disclosure may be corresponding to a device in the device management method in the embodiment of the present disclosure and to the device 600 in the embodiment of the present disclosure, and the foregoing and other operations and/or functions of the modules in the device 800 are respectively used to implement the corresponding procedures of the methods 200 to 500 in FIG. 2 to FIG. 5. For brevity, details are not described herein.

In this embodiment of the present disclosure, a device 800 feeds back to a device management controller only a status of current device management information compared with device management information in a previous query period. This effectively reduces a transmission amount of device management information, and can reduce occupied management bus bandwidth between the device management controller and the device 800 such that the device management controller can manage more devices 800.

Figure 9:
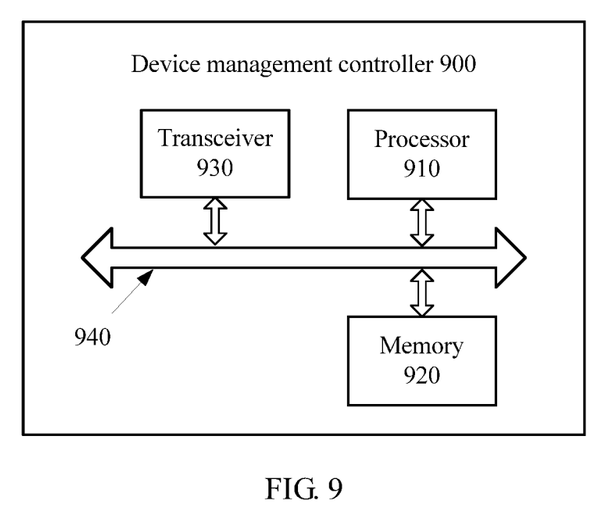
FIG. 9 is a schematic block diagram of a device management controller according to another embodiment of the present disclosure.

FIG. 9 is a schematic block diagram of a device management controller 900 according to another embodiment of the present disclosure. As shown in FIG. 9, the device management controller 900 includes a processor 910, a memory 920, and a transceiver 930. The processor 910, the memory 920, and the transceiver 930 are connected using a bus 940. The bus 940 may include a data bus, and may further include a power bus, a control bus, a status signal bus, and the like. The memory 920 may include a ROM and a RAM, and may provide an instruction and data for the processor 910.

The transceiver 930 is configured to send a first instruction message to a device, and receive a first feedback message sent by the device according to the first instruction message, where the first feedback message indicates a status of current device management information of the device compared with device management information in a previous query period.

The processor 910 is configured to manage the device according to the first feedback message.

Device management information may include at least one piece of the following information: an in-position status, a temperature, a power status, a working status, storage space, or software configuration information of the device.

In this embodiment of the present disclosure, a device management controller 900 receives from a device a status of current device management information compared with device management information in a previous query period. This effectively reduces a transmission amount of device management information, and can reduce occupied management bus bandwidth between the device management controller 900 and the device such that the device management controller 900 can manage more devices. In addition, in this embodiment of the present disclosure, the device management controller 900 only needs to process changed and/or abnormal information, and does not need to repeatedly process same device management information, thereby saving CPU resources of the device management controller 900.

Optionally, in another embodiment, the first feedback message includes changed and/or abnormal information in the device management information.

Optionally, in another embodiment, the first feedback message indicates that the device management information is unchanged or normal. The device management controller 900 may perform processing the same as that in a previous query when the first feedback message indicates that the device management information is unchanged, and the device management controller 900 may not perform processing when the first feedback message indicates that the device management information is normal.

Optionally, in another embodiment, the first feedback message indicates that the device management information is changed and/or abnormal. The transceiver 930 may be further configured to send a second instruction message to the device according to the first feedback message, where the second instruction message instructs the device to send changed and/or abnormal information in the device management information to the device management controller 900, and receive a second feedback message sent by the device, where the second feedback message includes the changed and/or abnormal information in the device management information. The processor 910 is configured to manage the device according to the second feedback message.

It should be understood that the device management controller 900 in this embodiment of the present disclosure may be corresponding to a device management controller in the device management method 300 in the embodiment of the present disclosure and to the device management controller 700 in the embodiment of the present disclosure, and the foregoing and other operations and/or functions of the modules in the device management controller 900 are respectively used to implement the corresponding procedures of the methods 300 to 500 in FIG. 3 to FIG. 5. For brevity, details are not described herein.

In this embodiment of the present disclosure, a device feeds back to a device management controller 900 only a message about a status of device management information in a current query period compared with device management information in a previous query period. This effectively reduces a transmission amount of device management information, and can reduce occupied management bus bandwidth between the device management controller 900 and the device such that the device management controller 900 can manage more devices. In addition, in this embodiment of the present disclosure, the device management controller 900 only needs to process changed and/or abnormal information, and does not need to repeatedly process same device management information, thereby saving CPU resources of the device management controller.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device management method, comprising:
   sending, by a baseboard management controller (BMC) in a non-volatile memory express (NVMe) system, an instruction message to instruct multiple NVMe devices in the system to detect device management information, wherein the device management information comprises at least two pieces of the following information: an in-position status, a temperature, a power status, a working status, storage space, and software configuration information of the device;
   comparing, by each NVMe device, each current piece of device management information with each piece of device management information in the previous query period; determining, by each NVMe device, whether current device management information is changed;
   generating, by an NVMe device whose current device management information is changed, a feedback message;
   receiving, by the BMC, the feedback message from the NVMe device whose current device management information is changed, wherein the feedback message indicates at least one piece of changed device management information, wherein the feedback message indicates at least one piece of changed device management information using a number and a value, and wherein each number corresponds to each type of the device management information; and
   managing, by the BMC, the NVMe device whose current device management information is changed according to the at least one piece of changed device management information.

2. The method according to claim 1, wherein the NVMe device whose current device management information is changed sends a first feedback message comprising the number of the changed type of the device management information, and sends a second feedback message comprising the changed value of the device management information.

3. The method according to claim 1, further comprising considering, by the BMC, device management information of an NVMe device which does not send a feedback message as unchanged.

4. A system, comprising:
   multiple non-volatile memory express (NVME) devices; and
   a baseboard management controller (BMC) configured to send an instruction message to an NVMe system to instruct the multiple NVMe devices in the system to detect device management information, wherein the device management information comprises at least two pieces of the following information: an in-position status, a temperature, a power status, a working status, storage space, and software configuration information of the device,
   wherein each of the multiple NVMe devices is configured to compare each current piece of device management information with each piece of device management information in the previous query period, and determine whether current device management information is changed,
   wherein an NVMe device whose current device management information is changed is configured to generate a feedback message,
   wherein the BMC is further configured to receive the feedback message from the NVMe device whose current device management information is changed,
   wherein the feedback message indicates at least one piece of changed device management information,
   wherein the feedback message indicates at least one piece of changed device management information using a number and a value,
   wherein each number corresponds to each type of the device management information, and
   wherein the BMC manages the NVMe device whose current device management information is changed according to the at least one piece of changed device management information.

5. The system according to claim 4, wherein the NVMe device whose current device management information is changed sends a first feedback message comprising the number of the changed type of the device management information, and sends a second feedback message comprising the changed value of the device management information.

6. The system according to claim 4, wherein the BMC is further configured to consider device management information of an NVMe device which does not send a feedback message as unchanged.

* * * * *